United States Patent
David et al.

(10) Patent No.: US 11,961,003 B2
(45) Date of Patent: Apr. 16, 2024

(54) TRAINING A STUDENT NEURAL NETWORK TO MIMIC A MENTOR NEURAL NETWORK WITH INPUTS THAT MAXIMIZE STUDENT-TO-MENTOR DISAGREEMENT

(71) Applicant: Nano Dimension Technologies, Ltd., Ness Ziona (IL)

(72) Inventors: Eli David, Tel Aviv (IL); Eri Rubin, Tel Aviv (IL)

(73) Assignee: NANO DIMENSION TECHNOLOGIES, LTD., Ness Ziona (IL)

( * ) Notice: Subject to any disclaimer, the term of this patent is extended or adjusted under 35 U.S.C. 154(b) by 0 days.

(21) Appl. No.: 16/923,913

(22) Filed: Jul. 8, 2020

(65) Prior Publication Data

US 2022/0012595 A1   Jan. 13, 2022

(51) Int. Cl.
*G06N 3/044* (2023.01)
*G06N 3/086* (2023.01)

(52) U.S. Cl.
CPC .............. *G06N 3/086* (2013.01); *G06N 3/044* (2023.01)

(58) Field of Classification Search
CPC ............................ G06N 3/086; G06N 3/0445
See application file for complete search history.

(56) References Cited

U.S. PATENT DOCUMENTS

| | | |
|---|---|---|
| 5,265,192 A | 11/1993 | McCormack |
| 9,721,214 B1 | 8/2017 | Corrado et al. |
| 10,699,194 B2 | 6/2020 | David |
| 2003/0130899 A1 | 7/2003 | Ferguson et al. |
| 2003/0233335 A1 | 12/2003 | Mims |

(Continued)

FOREIGN PATENT DOCUMENTS

WO   WO 2004/010282   1/2004

OTHER PUBLICATIONS

Li et al., "Urban Flood Mapping with an Active Self-Learning Convolutional Neural Network Based on TerraSAR-X Intensity and Interferometric Coherence," in 152 ISPRS J. Photogrammetry and Remote Sensing 178-91 (2019). (Year: 2019).*

(Continued)

*Primary Examiner* — Ryan C Vaughn
(74) *Attorney, Agent, or Firm* — PEARL COHEN ZEDEK LATZER BARATZ LLP

(57) ABSTRACT

A device, system, and method is provided for training a new neural network to mimic a target neural network without access to the target neural network or its original training dataset. The target neural network and the new neural network may be probed with input data to generate corresponding target and new output data. Input data may be detected that generate a maximum or above threshold difference between the corresponding target and new output data. A divergent probe training dataset may be generated comprising the input data that generate the maximum or above threshold difference and the corresponding target output data. The new neural network may be trained using the divergent probe training dataset to generate the target output data. The new neural network may be iteratively trained using an updated divergent probe training dataset dynamically adjusted as the new neural network changes during training.

30 Claims, 3 Drawing Sheets

(56) References Cited

U.S. PATENT DOCUMENTS

| | | | |
|---|---|---|---|
| 2005/0192914 | A1 | 9/2005 | Drege et al. |
| 2013/0132311 | A1 | 5/2013 | Liu et al. |
| 2015/0370251 | A1 | 12/2015 | Siegel et al. |
| 2015/0379072 | A1 | 12/2015 | Dirac et al. |
| 2016/0063393 | A1 | 3/2016 | Ramage et al. |
| 2016/0078339 | A1 | 3/2016 | Li et al. |
| 2016/0300156 | A1 | 10/2016 | Bowers et al. |
| 2017/0083829 | A1 | 3/2017 | Kang et al. |
| 2017/0132528 | A1 | 5/2017 | Aslan et al. |
| 2017/0308324 | A1 | 10/2017 | Courville et al. |
| 2018/0000385 | A1 | 1/2018 | Heaton et al. |
| 2018/0157992 | A1 | 6/2018 | Susskind et al. |
| 2018/0268292 | A1 | 9/2018 | Choi et al. |
| 2018/0322417 | A1 | 11/2018 | Bendre et al. |
| 2019/0034764 | A1 | 1/2019 | Oh et al. |
| 2019/0051290 | A1 | 2/2019 | Li et al. |
| 2019/0197406 | A1 | 6/2019 | Darvish Rouhani et al. |
| 2019/0205748 | A1 | 7/2019 | Fukuda et al. |
| 2019/0206090 | A1 | 7/2019 | Ray et al. |
| 2019/0370665 | A1 | 12/2019 | David |
| 2020/0034703 | A1* | 1/2020 | Fukuda .................... G06N 3/08 |

OTHER PUBLICATIONS

Lu et al., "Exploiting Multiple Classifier Types with Active Learning," in Proc. 11th Ann. Conf. Genetic and Evolutionary Computation 1905-06 (2009). (Year: 2009).*

Melville et al., "Constructing Diverse Classifier Ensembles using Artificial Training Examples," in Proc. IJCAI 505-10 (2003). (Year: 2003).*

Seung et al., "Query by Committee," in Proc. 5th Ann. Workshop on Computational Learning Theory 287-94 (1992). (Year: 1992).*

Zhou et al., "Private Deep Learning with Teacher Ensembles," in arXiv preprint arXiv: 1906.02303 (2019). (Year: 2019).*

Yang et al., "A Novel Emotion Recognition Approach Based on Ensemble Learning and Rough Set Theory," in 9th IEEE Int'l Conf. Cognitive Informatics 46-52 (2010). (Year: 2010).*

International Search Report and Written Opinion of the International Searching Authority from International application No. PCT/IL18/51345 dated Mar. 5, 2019.

Correia-Silva et al., "Copycat CNN: Stealing Knowledge by Persuading Confession with Random Non-Labeled Data", IEEE, Jun. 14, 2018, pp. 1-8.

Tramer et al. "Stealing Machine Learning Models via Prediction APIs", 2016, 25th USENIX Security Symposium.

Papernot et al. "Practical Black-Box Attacks against Machine Learning", 2017, Proceedings of the 2017 ACM on Asia Conference on Computer and Communications Security.

Shi et al. "How to Steal a Machine Learning Classifier with Deep Learning" 2017, IEEE.

Shokri et al. "Membership Inference Attacks Against Machine Learning Models", 2017, 2017 IEEE Symposium on Security and Privacy (SP).

Juuti et al., "PRADA: Protecting against DNN Model Stealing Attacks", May 2018, arXiv.org, retrieved from https://arxiv.org/abs/1805.02628v1.

U.S. Appl. No. 16/910,744, filed Jun. 24, 2020.

Orekondy Tribhuvanesh et al. :"Knockoff Nets: Stealing Functionality of Black-Box Models", 2019 IEEE/CVF Conference on Computer Vision and Pattern Recognition (CVPR) ,IEEE, Jun. 15, 2019 (Jun. 15, 2019), pp. 4949-4958,XP033686927.

Akisato Kimura et al.: "Few-shot learning of neural networks from scratch by pseudo example optimization", Arxiv. Org, Cornell University Library, 201 Olin Library Cornell University Ithaca, NY 14853, Feb. 8, 2018 (Jul. 15, 2018), XP081239560.

Wang Dongdong et al.: "Neural Networks Are More Productive Teachers Than Human Raters: Active Mixup for Data-Efficient Knowledge Distillation From a Blackbox Model", 2020 IEEE/CVF Conference on Computer Vision and Pattern Recognition (CVPR), IEEE, Jun. 13, 2020 (Jun. 13, 2020), pp. 1495-1504, XP033805184, DOI: 10.1109/CVPR42600.2020.00157.

Nayak Gaurav Kumar et al.: "Zero-Shot Knowledge Distillation in Deep Networks", ARXIV, May 20, 2019 (May 20, 2019), XP055823605, Retrieved from the Internet: URL:https://arxiv.org/pdf/1905.08114.pdf.

European Search Report for Pat. Appl. No. 21178887.2 dated Dec. 15, 2021.

* cited by examiner

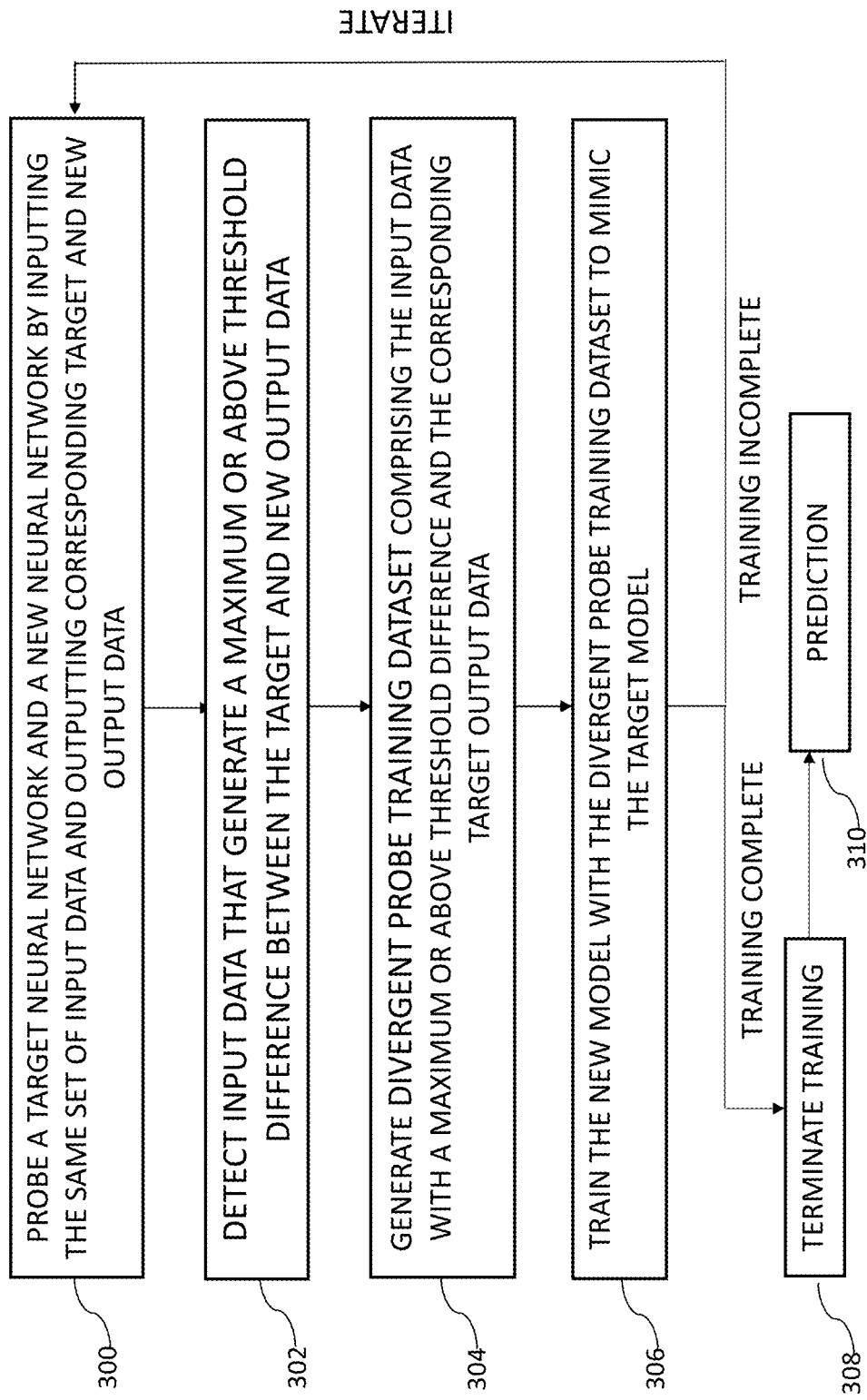

TRAINING A STUDENT NEURAL NETWORK TO MIMIC A MENTOR NEURAL NETWORK WITH INPUTS THAT MAXIMIZE STUDENT-TO-MENTOR DISAGREEMENT

FIELD OF THE INVENTION

Embodiments of the invention relate to the field of artificial intelligence (AI) by machine learning. In particular, embodiments of the invention are related to training a predictive or deep learning model such as a neural network (NN), logistic regression, or Bayesian model.

BACKGROUND OF THE INVENTION

An artificial neural network, or simply "neural network," is a computer model, resembling a biological network of neurons. Neural networks are a family of methods within machine learning, under artificial intelligence. Neural networks typically have a plurality of artificial "neurons" that are connected by artificial "synapses." There are many types of NNs that have various arrangements of neurons including partially or fully connected NNs, recurrent NNs (RNNs), convolutional NNs (CNNs), etc. For example, a connected NN typically has an input layer, multiple middle or hidden layer(s), and an output layer, where each layer has a plurality (e.g., 100s to 1000s) of artificial neurons. In a fully-connected NN, each neuron in a layer (N) may be connected by an artificial "synapse" to all neurons in a prior (N−1) layer and subsequent (N+1) layer, whereas in a partially-connected NN only a subset of neurons in adjacent layers are connected.

A NN is trained based on a leaning dataset to solve or learn a weight of each synapse indicating the strength of that connection. The weights of the synapses are generally initialized, e.g., randomly. Training is performed by iteratively inputting a sample or set of samples from the training dataset into the NN, outputting a result of the NN applied to the dataset, calculating errors between the expected (e.g., target) and actual outputs, and adjusting NN weights to minimize errors. Training may be repeated until the error is minimized or converges. Typically, multiple passes (e.g., tens or hundreds) through the training set are performed (e.g., each sample is input into the NN multiple times). Each complete pass over the entire training dataset of the same data is referred to as one "epoch".

Training an accurate NN is typically a complex and time-consuming task. A typical training process consists of billions (or trillions) of calculations that may take hours, days or even weeks to complete. So, once produced, other devices or parties may want to replicate an accurately trained NN, instead of developing one from scratch. However, NNs and their training data are often kept secret for data privacy, security, or proprietary reasons. Without access to the secret training dataset, other devices or parties cannot currently replicate a pre-trained NN.

Another limitation of conventional NNs is that new information cannot be added or old information deleted from the NN without retraining based on the entire training dataset. Training based solely on the changed data will override old neural connections and knowledge. Thus, to incorporate new data into the NN, no matter how minor, the training process is re-run from scratch with the original training dataset and the new samples added, which is a time-consuming process. Similarly, undesirable training data cannot be eliminated from the NN without completely retraining the NN based on the entire revised training dataset. In fact, any modification that re-trains the NN requires retraining over the entire training dataset. Thus, the NN cannot be modified or improved by devices or parties that do not have access to the original training dataset.

Accordingly, there is a need in the art to provide a mechanism to mimic and/or modify a NN without access to its secret original training dataset.

SUMMARY OF THE INVENTION

Embodiments of the invention provide a device, system and method for training a new ("student") neural network to mimic a pre-trained target ("mentor") neural network without access to the target neural network itself (a "black box" network) or to the original training dataset used to generate the target neural network (secret training data). Training data may be generated by probing the target "black box" network with input data and recording its corresponding outputs, to learn the target network's behavior. To accelerate training, embodiments of the invention may generate a divergent probe training dataset with inputs that maximize divergent behavior between the student and mentor networks' outputs. Divergent behavior may be measured based on differences between outputs of the student and mentor networks' output layer and/or one or more other hidden layers, resulting from the same input. Probe input data that generate a maximum or above threshold of divergent output behavior between the student and mentor networks isolate the differences between those networks that have a greater need for training, rather than their commonalities that require less or no training. Training the student network using such a divergent probe training dataset, focuses training on the differences (and less on the commonalities) between the student and mentor networks, which generates greater magnitudes of errors and corrections, thereby accelerating training, and improving accuracy for the same number of training iterations, as compared to training using a random or equally distributed training dataset.

According to some embodiments of the invention, there is provided a device, system and method for training a new neural network to mimic a target neural network without access to the target neural network or its original training dataset. The target neural network and the new mimicking neural network may be probed with input data to generate corresponding data output by one or more layers of the respective target neural network and new neural network. Input data may be detected that generate a maximum or above threshold difference between corresponding data output by the target neural network and the new neural network. A divergent probe training dataset may be generated comprising the input data that generate the maximum or above threshold difference and the corresponding data output by the target neural network. The new neural network may be trained to generate substantially the same corresponding output data as the target neural network using the divergent probe training dataset detected to generate the maximum or above threshold difference in the corresponding output data between the new and the target neural network. The new neural network may be iteratively trained using an updated divergent probe training dataset dynamically adjusted as the new neural network changes during training.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a flowchart of a method for training a new student neural network to mimic a target neural network in accordance with some embodiments of the invention.

Figure 1:
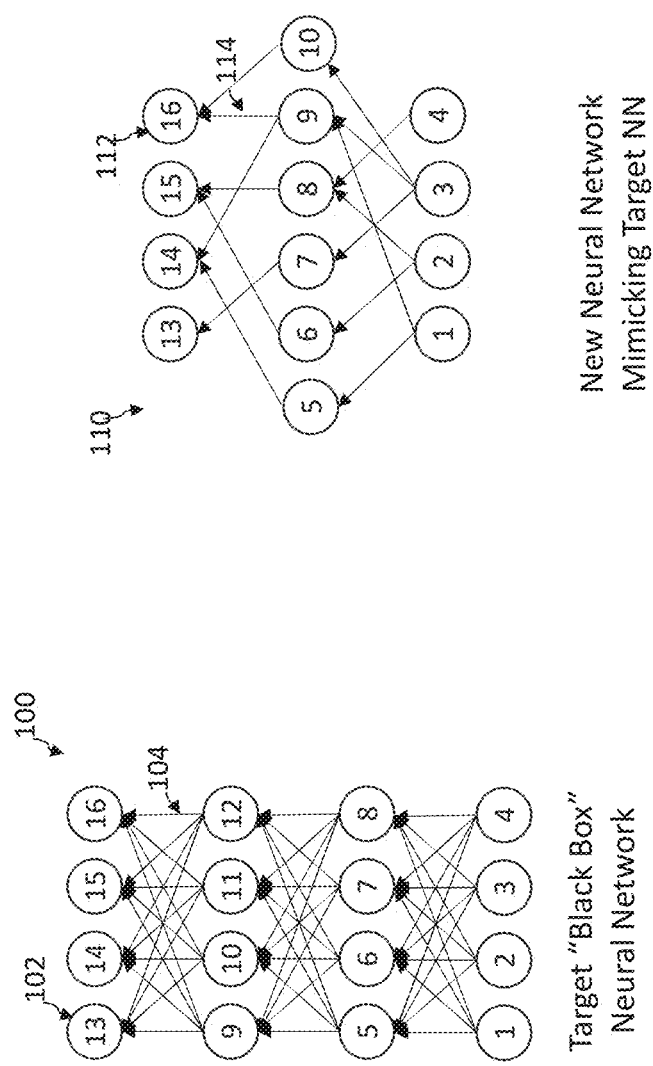
FIG. 1 is a schematic illustration of an example target "black box" neural network and a new student neural network trained to mimic the target neural network in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

According to embodiments of the invention, there is now provided a device, system, and method for training a new ("student") neural network to mimic, replicate, imitate, or reverse engineer, a pre-trained target ("mentor") model without access to the model itself (a "black box" model) and/or without access to the original training data used to generate that model (secret training data). This may be achieved by probing the target "black box" model with input data and recording its corresponding outputs, to generate a probe training dataset that defines how the target model behaves. The closer the input probe data are to the original training dataset, the more accurately the student network will mimic the mentor network and the faster the training will take for the student and mentor models to converge. However, without access to the original secret training data, systems are relegated to guess and probe the mentor network with random inputs, which generally produce a less accurate mimicking student network and/or takes longer to train the models to converge as compared to training with the original secret training dataset.

According to embodiments of the invention, there is now provided a device, system, and method to accelerate training a new student network to mimic a target mentor network by using a divergent probe training dataset comprising input data that maximize differences, divergence or discordance, between outputs of the new student network and the target mentor network. Because the student network is initially untrained, probe input data that yield relatively small output differences between student and mentor networks, activate commonalities in the predictive behavior (e.g., activating corresponding neural patterns) between the mentor and untrained student networks. Such probe input data that generate minimal differences, resembles "easy" questions that an untrained model already knows how to answer, and has little corrective effect. Training based on such easy questions with little correction would be relatively slow. In contrast, probe input data that yield maximal or above threshold differences in predictive outputs between student and mentor networks activate divergent predictive behavior (e.g., activating non-corresponding neural patterns) between the mentor and untrained student. Such probe input data that generate maximal output differences, resemble "difficult" questions that the mentor knows but the untrained student does not, and therefore have the greatest corrective impact and change during training. Training based on such hard questions results in relatively large errors and corrections, accelerating the training process.

As training proceeds, two opposing forces emerge—a training force that trains the student network behavior to converge to the mentor network's (a "convergence" force), and an opposing force that generates probe data to maximize output differences between the student and mentor network behavior (a "divergence" force). By selecting training data inputs that maximize the gap between the student and mentor networks outputs with this divergence force, embodiments of the invention generate probe input data that isolate and correct the divergent neural patterns therebetween (more so that the common or already trained neural patterns). By focusing on output patterns that are dissimilar and thereby in greater need of correction (and less on those that are similar and require less training), embodiments of the invention reduce training time as compared to student-mentor training using randomly distributed input probe data. For example, depending on the complexity of the mentor model, training using the divergent probe training dataset according to embodiments of the invention is, for example, from 10 times up to 1000 times faster (e.g., for training to converge to a below threshold error) than using random probe data. The more complex the mentor network, the greater the improvement will be between embodiments of the invention and a naïve random probe approach to obtain the same results.

Once the student network learns the mentor network's behavior for a current iteration's training dataset, that training dataset no longer yields a maximum or above threshold output difference, but a minimum or below threshold output difference, between student and mentor networks. Accordingly, as the student network is trained, output differences between the student and mentor networks may be continuously or iteratively monitored and updated (e.g., in real-time, periodically, or upon detecting events). The training dataset may be iteratively updated, during the training period, based on those updated difference measures, to dynamically adapt the training datasets to reflect each sequential iteration's maximum or above threshold difference training data. This divergent probe training dataset may be updated, for example, according to a schedule such as periodically (e.g., every predefined number of N iterations (pairs of forward prediction and backward error correction passes), each epoch, etc.) or upon detecting an event such as satisfying a training goal (e.g., when the output differences for the student and mentor networks converge to a below threshold error for the current training dataset). The training dataset may be updated as a whole (e.g., based on an average, mean or standard deviation error thereof) or for individual input-output pairs (e.g., individual input-output pairs with reduced or below threshold difference measures may be deleted and replaced with input-output pairs with newly relatively greater, maximal, or above threshold, difference measures). An example process may include iteratively: (1) generating a current Nth iteration training dataset such that the prediction difference between the two models is maximized or above threshold, (2) training the student neural network with the Nth current iteration training dataset until the prediction difference between the two models is minimized or below threshold (e.g., to within a convergence threshold), (3) returning to step (1) and incrementing N to generate a new N+1$^{st}$ iteration training dataset and repeating until the student and target neural networks converge. Iteratively updating the training dataset to the most-recent divergent probe training data, continuously or incrementally raises the difficulty level and corrective efficacy of the training data as the networks converge. Accordingly, as the student and mentor networks get closer and closer to each others' behavior, embodiments of the invention continually isolate their differences, to maintain fast and efficient network convergence.

In some embodiment, the divergence in network behavior may not only be measured by differences in the single output layer, but additionally or alternatively, by differences in any combination of one or more other intermediate or hidden layers, neurons, and/or synapses, of the networks. Some embodiments may measure the difference between the outputs (activations) of the student and mentor models corresponding to any individual or combination of one or more of the first hidden layer 1, the second hidden layer 2, . . . , the final hidden layer N−1, and/or the output layer N. For example, where different patterns of neurons, weights, layers, etc. have trained connections in the student and mentor layers (e.g., trained to be co-activated for the same input), embodiments of the invention may detect activation of divergent or non-related patterns. Additionally or alternatively, where the mentor and student have the same structure (e.g., where the mentor network, but not the original training dataset, is known), connected patterns may refer to the same structures (e.g., neurons, synapses, layers, etc.) in both networks.

Divergent probe training dataset may be generated in a variety of ways. In some embodiments, the training data may be generated by testing using random seed probes and extrapolating divergent probe training data based on resulting network behavior. Random sample probes can be used to learn the inputs, types and/or distributions that maximize student/mentor output differences, after which those optimal samples may be used as seeds for categorizations, clustering, extrapolation, etc. to grow training datasets therefrom of similar types and/or distributions. For example, random seed probes, evenly distributed across the input space may be tested as inputs, and those corresponding to one or more maximum or above threshold divergent outputs may be selected as seeds to extrapolate more inputs of similar types or input space distributions (e.g., that have similar categorizations or clustering as the selected seed inputs). For example, input types or distributions may be selected, for which the same (or small and/or below threshold variations of) input data cause large and/or above threshold variations in corresponding outputs between the student and master networks. Additionally or alternatively, the training data may be generated using statistics or heuristics-based methods. For example, some embodiments may use various input data distributions (e.g., Gaussian) and measure which distribution causes the greatest divergence. Additionally or alternatively, the training data may be generated using machine learning or training-based methods, such as, using additional neural networks, evolutionary models, etc. In some embodiments, an additional (e.g., third) neural network may be trained to generate outputs that are fed as inputs into both the student and mentor models, and measure the difference in those outputs. This additional neural network is trained to output values that, when input into the student and mentor network, cause maximal or above threshold differences between the corresponding student and mentor network outputs. The inputs to the additional training data generator neural network may be random, the same or different input types (images, audio, text, etc.), the output of the random seed probe or other method, etc. The second student network and third training data generator network may be trained in parallel, concurrently, or in alternating time periods. For example, the third training data generator network may be trained to generate outputs that maximize the difference between the student and mentor models (the divergent force), and the student model trains by continuously or iteratively inputting the outputs of the third training data generator network to minimize the difference between the student and mentor models (the convergent force). Additionally or alternatively, the divergent probe training dataset may be generated using evolutionary models. For example, the training data generator may be an evolutionary model (e.g., a genetic algorithm, genetic programming, etc.) that learns to create outputs that maximize the output differences between the student and mentor models. Example genetic algorithms include model recombination, model mutations, etc., for example, as disclosed in U.S. Pat. No. 10,339,450, which is incorporated herein by reference in its entirety.

By learning how the target black-box model behaves with the divergent probe training dataset that maximizes differences in the new model's behavior, the new model may be trained to behave substantially the same as the target model faster than using random probe data, without ever accessing the original training dataset that caused it to behave as such. Accordingly, the new model may replicate the target model efficiently without sacrificing the secrecy of the target model's original training dataset.

For example, a target or "mentor" model may be pre-trained for autonomous vehicle driving, drone navigation, facial recognition, text recognition, or any other deep learning application. Embodiments of the invention may probe the mentor model with the sensor, image, and/or other input data to detect the input data that generates a maximum or above threshold difference between the student and mentor networks' outputs. Embodiments of the invention may generate a divergent probe training dataset to comprise those maximum or above threshold difference input data and corresponding outputs from the mentor model. This probing process may repeat over many (e.g., thousands or millions) of iterations, where in each iteration, embodiments of the invention may generate a new divergent probe training dataset, and/or use that most recent divergent probe training dataset to train the student model. Training the student model to match how the mentor model behaves when probed with divergent probe training data causes the student model to efficiently approach the mentor model by focusing training on the divergent behavior between the student and mentor models. Training may complete when the student and target models converge (e.g., when the student model outputs substantially matches the mentor model outputs, such as yielding the same predictions for an above threshold proportion (e.g., >98%) of inputs), or when the divergent probe training datasets for sequential iterations converges (e.g., sequential updates of the divergent probe training dataset yield similar and/or below threshold maximum differences between student and mentor network outputs for the same inputs).

In some embodiments, the target model may be represented as a transformation or map of data from an X-dimensional input space to a Y-dimensional output space. In one example, for recognizing numbers in images, the input data may be images of size 100×100 pixels in a 10000 dimensional input space, and the output data may be 10 digits in a 10 dimensional output space. Therefore, the target model is a transformation from a 10000 dimensional data point to a 10 dimensional data point (although the target transformation may map data from any X-dimensional space to any Y-dimensional space). The training dataset includes pairs of input and corresponding output data (X-dimensional vector or point, Y-dimensional vector or point) used to train that transformation. With no access to this original training dataset, embodiments of the invention may generate a divergent probe training dataset to include input data points in the X-dimensional space that generate a maximum or above threshold difference between corresponding Y-dimensional output data predicted by the target and student networks. The divergent probe training dataset also comprises the Y-dimensional outputs of the target transformation that correspond to those maximum or above threshold difference X-dimensional input data. The set of pairs of X-dimensional inputs and corresponding Y-dimensional outputs of the divergent probe training dataset may be used to train a new student transformation to map data in the same way as the target transformation. Although the divergent probe training dataset has a different distribution of points in the X and Y-dimensional spaces than the original training dataset, the points are transformed according to the same target transformation, and so will train the new student model transformation to map data in substantially the same manner as the target model transformation.

In some embodiments of the random seed probe approach, random initial seed input data may be used for probing the student and target neural networks to measure their divergent behavior, and the seed input data causing the most divergent behavior are propagated to extrapolate other input probe data of similar categories, clusters, etc. This random initial seed input data may be either fully-random or semi-random. Fully random seed input data may be selected entirely at random (e.g., a random distribution of points in an input X-dimensional space) and not set to a particular type or specific data. Fully-random seed data may wildly span the input space, providing both relevant and irrelevant input data. The closer the random probe dataset is to the original training dataset, the better the student model will typically match the target model and the faster the training takes to converge. Accordingly, to increase speed, efficiency and accuracy, instead of initiating generating the divergent probe training dataset with fully random seed data, some embodiments of the invention may use semi-random seed input data that are as similar as possible to (but different from) the original training dataset.

Partially or semi-random seed input data may be selected randomly, but with a preference among samples, based on some knowledge of the model or training dataset, such as the type or purpose of the target model. For example, if the purpose of the target model is to identify faces in images, the seed input data may be narrowed to images of faces. In another embodiment, the semi-random seed input data may include a portion of data from the original training dataset (e.g., a 10% "public" or "non-secret" subset of the original training dataset, but not the remaining 90% designated as "confidential" or "secret") that may be supplemented with divergent probe training data. In another embodiment, semi-random seed input data may include unlabeled or untagged data (e.g., an image dataset with no knowledge via labels of what type of images are in the dataset).

Some embodiments may learn information about the original training dataset by performing statistical analysis to measure properties (e.g., color, contrast, standard deviations, local correlations, etc.) of a portion of the original training data (if available) or of data of the same type as the original training dataset (e.g., images of faces). Statistical analysis may be performed on a relatively small sample of data (e.g., 0.1-10% of the size of the original training dataset). The result of the statistical analysis may be a non-uniform distribution of the input space similar to that of the original training dataset. This distribution may be used to select the random seed input data according to the same non-uniform distribution to better match the original training set. In various embodiments, these statistics may be run on random data of the same type as the original training data, or on a portion of the original training dataset (e.g., 1% of original training dataset, if available), or on a hybrid combination of the actual portion of the original training dataset and a portion of samples synthesized therefrom (e.g., 50% original training samples and 50% randomly generated samples).

The seed input data may be tuned to more closely match or converge to the original training data (e.g., having an input space distribution that more closely resembles that of the original training data, compared to a uniform input space distribution). In one embodiment, where the type or distribution of training data is unknown (e.g., not clear if it is image, text, or audio data, or if the distribution of data in the input space is Gaussian or constant), the target model may be probed to discern the type or distribution of training data. Ideally, minor adjustments in samples of the correct type or distribution (e.g., same as or substantially similar to the training dataset) will typically result in small changes to the model output (stable model), whereas minor adjustments in samples of the incorrect type or distribution may result in relatively large changes to the model output (unstable model). Accordingly, some embodiments may probe the model with multiple slightly different samples, e.g., varied according to a Gaussian, uniform, or other distributions and/or for each of a plurality of different data types. The data type and/or distribution for which the model is most stable (e.g., where relatively small changes in the input space cause relatively small changes in the output space) may be used as the data type and/or distribution of the seed input data. This mechanism may be performed in an initial test probe of the target model, e.g., prior to divergent behavior probes that test student-mentor output differences for ultimately extrapolating the divergent probe training dataset. For example, probing with random seed input data may be a first iteration, after which the seed data are incrementally adjusted to maximize or increase divergent student-mentor outputs, in each subsequent iteration, to generate dynamically adjusted divergent probe training data.

In one embodiment, training error may be computed in the final output layer (e.g., based on the expected values of a training dataset compared to the calculated values) on-the-fly during training of the new student model. Training error may be measured as a "first-order" error (i.e., based on the first derivative of the error), such as "gradient descent" optimization including "backpropagation," a "second-order" error (i.e., second derivative), such as "Hessian-Free Optimization," a higher-order error, or another method such as "contrastive-divergence" based on mathematical principles. In some embodiments, the divergent probe training dataset (e.g., in a subsequent epoch) may be automatically adjusted on-the-fly to maximize the difference between student and mentor network outputs based on the most recently trained student model (e.g., trained in a current or past epoch).

In some embodiments, in which the target neural network model itself is accessible or its parameters known (e.g., the number N of layers in the model, the number, type and/or properties of neurons in each layer, etc.), the layers may be trained and/or the training error may be computed in a layer-by-layer manner. For example, given a target model with N layers, and each layer having $X_i$ neurons (index i between 1 and N), a new network may be trained in a plurality of stages in which each stage trains a sequential layer, one layer at a time. In a first stage, the new network may be trained to mimic the output of the $X_1$ neurons in the 1st layer of the target network. After the 1st layer is trained, its values are fixed or frozen, and the process proceeds to train the next subsequent layer. Thereafter, in a second stage, with the prior first layer fixed, the new network may be trained to mimic the output of the $X_2$ neurons in the 2nd layer of the target network. In general, in each jth stage, the prior trained j−1 layers are fixed, and used to train the subsequent jth layer of the new network. This process may continue, layer-by-layer, until the final sequential Nth output layer is trained. Training the model layer-by-layer typically improves the accuracy and speed of training as compared to simultaneously training all layers in the model. The accuracy of the new network increases in the layer-by-layer approach because it incorporates additional intermediate transformations (e.g., mimicking one layer at a time) of the target network that are not generated in the full model training approach (which tries to mimic the output directly given an input, and has no insight into the N intermediate transformations that the data undergo within the N layers of the mentor model).

The speed of training the new network increases in the layer-by-layer approach because the cumulative computations for training one layer at a time (e.g., N−1 adjacent-layer transformations from layer i to layer i+1, i=1, . . . , N) are significantly simpler and less time-consuming than computations for training the entire model at once (e.g., transformation from input space X, across N layers, to output space Y). The layer-by-layer training method may progress, either in a "forward" direction, training from the 1st to the Nth layer (e.g., 1, 2, . . . , N layers), and/or in the "reverse" direction, training from the Nth to the 1st layer (e.g., N, N−1, N−2, . . . , 1 layers).

The training process may repeat for multiple epochs. Whereas conventional training reiterates over each epoch using the same training dataset, according to embodiments of the invention, because the training dataset is dynamically adjusted over time to maintain the maximum or above threshold difference for each iteration and/or epoch as the student model changes, a different divergent probe training dataset may be used during each of a plurality of (e.g., two or more, up to all) training iterations and/or epochs. Using different probe datasets may increase the diversity of training data, which typically increases the accuracy with which the new model mimics the target model in the same amount of training time or yields a similar accuracy in a faster training time.

Embodiments of the invention may test convergence of the new student model to the target model by probing both models with the most recent divergent probe training dataset or a random probe dataset to determine the similarity between the corresponding outputs generated by the student and target models. Training may terminate after a measure of such similarity exceeds a threshold, after a measure of the difference between the student and target corresponding outputs is below a threshold, and/or after a predetermined number of iterations and/or epochs. In some embodiments, a predetermined number of input/output training pairs, distribution of training pairs, number or diversity or epochs, may result in a sufficient or above threshold match (or lower than threshold error or distance) between the new and target models (e.g., when probed with input test data).

Whereas the new model behaves substantially the same as the target model, it may have a different structure. For example, if the models are NNs, they may have different architectures (e.g., fully connected, partially connected, RNN, CNN, etc.), different numbers of neurons, different numbers of layers, different connection types, etc. from each other (e.g., as shown in FIG. 1). While in some embodiments this may be an unintentional consequence of not knowing the structure of the target model, in other embodiments this may be an intentional way to reorganize the target model to a simpler student structure. For example, if a target neural network has a relatively complex structure (e.g., a greater than threshold number of neurons, layers or connections or a relatively complex neuron connection type, such as fully-connected), embodiments of the invention may generate a new model with a relatively simple structure (e.g., set to have a lower than threshold number of neurons, layers or connections or a relatively simple neuron connection type, such as partially-connected) that behaves in the same way to replace the complex target model. Simplifying the structure of the model (e.g., reducing the number of neurons, layers and/or connections) may reduce the size and memory space used to store the model and increase the processing speed (less time required for prediction).

In some embodiments, it may be desirable to add new knowledge, or remove existing knowledge, from the already trained target neural network. For example, as new training data become available or the model is expanded to address a new class of prediction, it may be desirable to add new data to the training dataset. Conversely, if old data are deemed sensitive or obsolete, these data should be eliminated from the training dataset, and the knowledge unlearned from the network. However, conventional models cannot simply be re-trained by training only on the new data or deleting old data, because such training would override accurate connections from the initial training, thereby deleting desirable prior knowledge. The only conventional way to incorporate new data or eliminate old data in conventional models is to obtain the original training dataset, add or delete the data to/from the original training dataset, and re-start the entire training process from scratch with the entire modified training dataset. However, when a third party wants to modify another's model, the third party may not be able to access the original training dataset.

According to some embodiments of the invention, there is now provided a device, system, and method to incorporate new training data or eliminate a partial subset of the original training dataset in a pre-trained target model without accessing the original training dataset. This may be achieved, instead of modifying the inaccessible original training dataset, by modifying the divergent probe training dataset. Thus, the new training dataset may comprise the divergent probe training data (e.g., acting as a stabilizer to maintain prior knowledge) plus or minus the added or deleted data, respectively (e.g., acting as a modifier to add new knowledge or forget old knowledge). Because the divergent probe training dataset mimics the original training dataset, adding or deleting data therefrom will effect substantially the same change in the model as if the data were added or deleted to/from the original training dataset itself. Thus, the target model may be modified or improved without ever accessing the original training dataset.

According to some embodiments of the invention, there is now provided a device, system, and method to delete or eliminate pre-existing knowledge of inputs, outputs and/or correlations therebetween from the original training dataset, without access to that knowledge, and thus, without the ability to directly delete those pre-existing inputs, outputs and/or correlations. This may be achieved by diluting or obfuscating pre-existing unknown input/output correlations with random correlations in the divergent probe training dataset, intentionally creating confusion in the new neural network, trained to render the old target network's correlations ineffective. Such embodiments of the invention do not directly delete training data (which cannot be directly deleted because they are unknown), but adds random input/output correlations to the divergent probe training dataset to obfuscate its training, weakening its true predictive correlation with false random correlations (misdirecting or confusing the new neural network), until the original training of that data is so diluted that it is indecipherable in the new neural network. The base training dataset may be the divergent probe training dataset or an otherwise secret training dataset. In one example, a company may want to remove secret records of people's faces, but cannot simply delete those picture because it does not have access to that secret data. Instead, embodiments of the invention create false input/output correlations linking the person's identity to pictures of random faces. For example, training the face recognition neural network to link a person's identity to 1,000 pictures of random faces will dilute and render ineffective the link of the person's identity to the picture of the person's true face, without ever knowing or obtaining the true picture or identity-picture correlation. Thus, embodiments of the invention train neural networks to eliminate input/output correlations without ever accessing that data themselves.

Additionally or alternatively, pre-existing knowledge of inputs, outputs and/or correlations therebetween may be eliminated, without access to that knowledge, by eliminating a category or class from the target model in the new model. Conventional models delete training pairs of input and output. For example, conventional facial recognition models delete an image of a face correlated to an identity, e.g., "Brian". In contrast, according to some embodiments of the invention, there is no access to input image of the face. Accordingly, embodiments of the invention may delete a category or classification of prediction (e.g., remove "Brian" or "Name" in general).

The same principle can be used for any re-training or post-processing of an already trained target model without ever accessing the original training dataset. Instead of re-training the target model (which requires the secret original target dataset), embodiments of the invention may retrain the new model that mimics the target model using the divergent probe training dataset (without exposing the secret original training dataset). Such re-training may include, for example, sparsifying the new model by deleting or pruning weak neuron connections to decrease the new model's size (e.g., as described in U.S. Pat. No. 10,366,322, which is incorporated herein by reference in its entirety) or evolving the new model using a genetic algorithm to increase the new model's search space and improve its accuracy (e.g., as described in U.S. Pat. No. 10,339,450, which is incorporated herein by reference in its entirety), or any other re-training method for example that lowers memory usage and size (e.g., creates a smaller neural network), increases processing speed, or increases the accuracy of the new neural network.

Models described herein may have any structure, including, but not limited to any type of neural networks (e.g., including fully connected as shown in FIG. 1, partially connected, RNN, CNN, etc.), logistic regression, Bayesian models, decision trees, random forest models, evolutionary algorithms (e.g., genetic algorithms, genetic programming, or evolution strategies), support vector machines (SVM), or any other type of machine learning model that, if given an input X, can learn to predict an output Y.

Embodiments of the invention provide several significant improvements:

A benefit of embodiments of the invention is that generating a divergent probe training dataset comprising input data that correspond to maximum or above threshold output differences between the new and target networks, focuses training on the differences (and less on the commonalities) between the new and target networks' predictive behavior. Accordingly, the divergent probe training dataset yields greater errors and corrections for the new network in each training iteration, and therefore a faster training time until the new and target networks converge, e.g., as compared with a random or equally distributed training dataset.

Another benefit is that, because embodiments of the invention can mimic and modify a target model without accessing the original training dataset, only the target model itself, but not the original training dataset, needs to be stored. Thus, after a target model is generated, the original training dataset may be deleted, resulting in a significant reduction in memory space (e.g., a reduction of gigabytes, terabytes, or in applications such as video analysis, petabytes, used to store a training dataset). Nothing significant is lost by deleting the original training dataset because embodiments of the invention can generate a probe training dataset on-the-fly to replace the original training dataset, thereby preserving the ability to reproduce or modify the target model. Additionally or alternatively, some embodiments may delete (not store) the probe training dataset from memory. In some embodiments, when training the new model, there is no need to store the probe training dataset because its data are continually or iteratively updated by probing the target and new models and therefore can be generated or regenerated as needed. In fact, because divergent probe training data are continually updated over time as the new network is trained, old divergent probe training data become obsolete, and need not be stored. By not storing the probe training dataset, the new model may be trained using a minimal amount of memory space. For example, a memory may temporarily store only a single maximal divergence training sample or set of samples for a single iteration or epoch, or less than a predetermined number of divergence training sample(s) or set of samples for less than a predetermined number of iterations or epochs (e.g., to fill a buffer or temporary memory) at a time. The system may delete the sample(s) on-the-fly, for example, after the sample(s) are used for training or when new updated divergence training sample(s) are added to the memory to replace the smallest difference or least recently used sample(s) in the buffer memory. Because embodiments of the invention can train the new model by only storing the probe training data being currently used (not storing the entire training dataset), training can be executed by devices with relatively small memory space (e.g., storing as little as megabytes of data), such as mobile devices, drones, etc. (e.g., devices 214 of FIG. 2).

Another benefit of not needing to share or store the original training dataset is data security. For example, a first device (e.g., 202 of FIG. 2) may allow a second device (e.g., 214 of FIG. 2) to replicate its target model without ever transmitting, sharing or exposing its original training dataset to the second device. In some embodiments, the first device permanently deletes the only copy of the original training dataset after training the target model. This permanent deletion is possible because embodiments of the invention provide means to efficiently mimic, modify, and re-train the model without the original training dataset by using a divergent probe training dataset. Permanently deleting the original training dataset provides absolute security because the data can never be recovered or exposed.

Another benefit of embodiments of the invention is that, whereas conventional training uses the same training data for all epochs, the divergent probe training data are continually or iteratively updated for each iteration and/or epoch to isolate the most recent divergent student-mentor model behavior, which changes as the student model changes during training. This diversity in training data, as well as the ability to isolate and correct the largest discrepancies in the models' behavior as those discrepancies change over time, may lead to faster training compared to conventional training using the same dataset in every epoch, thereby increasing the speed of training the new student model.

Another benefit of embodiments of the invention is that the new model may be constructed to have any desirable structure (e.g., neural network architecture, number of neural network layers, number of neurons, neural network connection type, etc.) different than the structure of the target model. The structure of the new model may be selected to be simpler than that of the target model (if known) as shown in FIG. 1 and/or result in a file size that is less than a predetermined value or the file size of the target model (if known). For example, the new model may be designed to have a fewer number of layers, a fewer number of neurons, or a simpler connection-type (e.g., partially-connected vs. fully-connected) than the target model. Thus, while the new model behaves just like the target model, the new model may have a smaller file size, occupying less memory space to store the new model, and a simpler model structure resulting in faster processing speeds to run the new model, relative to the target model. Further, because embodiments of the invention support re-training the new model, the new model may use a sparsification technique during the training process mimicking the target model, thus eliminating or pruning weak or negligible neuron connections to decrease the model size. Sparsification results in a linear speed-up on any hardware. For example, a 90% sparse neural network results in a 10 time speed-up in comparison to a non-sparse network. Additionally, or alternatively, the new model may use an evolutionary method to optimize the training process to better mimic the target model.

Another benefit of embodiments of the invention is that pre-existing knowledge may be deleted, without access to that knowledge, by diluting old connections with random data. In conventional systems, if a neural network has prohibited data, the entire neural network cannot be used and the training data cannot be shared as both risk revealing the prohibited data. In accordance with embodiments of the invention, prohibited data may be eliminated from the divergent probe training dataset, either by diluting them with random data to render them ineffective, or by eliminating a category or class associated with the prohibited data in the divergent probe training dataset. Such embodiments allow users to train the new neural network to mimic an otherwise prohibited neural network and training datasets, only without its prohibited data.

Reference is made to FIG. 1, which schematically illustrates an example unknown or "black box" target neural network 100 and a new student neural network 110 that mimics or substantially replicates the predictive behavior of the target neural network 100 in accordance with some embodiments of the invention. Although the target neural network 100 of FIG. 1 is shown as a fully-connected NN, this is merely an example NN, and any other NN structure or type may equivalently be used according to embodiments of the invention, including, but not limited to, partially connected NNs, RNNs, CNNs, etc.

Target neural network 100 includes a plurality of artificial neurons 102. Artificial neurons 102 may be arranged in a hierarchy of multiple layers. Neural network 100 may include an input layer (neurons 1-4), one or more middle or hidden layer(s) (neurons 5-12), and an output layer (neurons 13-16). Each neuron 102 in each layer is connected by an artificial synapse connection 104 to some neurons (partially-connected) or all neurons (fully-connected) in an adjacent layer. Neurons (1-4) in the input layer are connected to neurons in the subsequent higher layer, neurons (5-12) in the middle layers are each connected to neurons in both the previous and subsequent layers, and neurons (13-16) in the output layer are connected to neurons in the previous lower layer. Target neural network 100 may be represented by a plurality of weights representing the strengths of the respective plurality of synapse connections 104. The structure of target neural network 100 is only an example, and any other arrangement of neurons, synapses, layers, or connection types may be used.

A local device (e.g., 214 of FIG. 2) cannot directly copy or retrain target neural network 100 using conventional methods because the target neural network 100 itself as well as the original training dataset used to train target neural network 100 are inaccessible to the local device. For example, target neural network 100 may be stored at a remote location (e.g., stored exclusively at one or more remote databases or servers 202 of FIG. 2) where it is kept secret from, and inaccessible to, the local device. Likewise, the original training dataset may also be stored at the same or different remote location (e.g., stored exclusively at one or more remote databases or servers 202 of FIG. 2) where it is kept secret from, and inaccessible to, the local device, or the original training dataset may be permanently deleted after training is complete. In some embodiments, the only access the local device has to the target neural network 100 is through sending inputs to, and receiving their corresponding outputs from, the remote device. The local device may request that the remote device probe the target neural network 100 and the new neural network 110 with the same set of inputs. The remote device may run those inputs through the two models 100 and 110 and return the corresponding respective outputs to the local device. The local device may measure (or receive a measure from the remote device) of a difference between the corresponding outputs of the target and new models 100 and 110 for each of the same inputs. The local device may detect which input data generate a maximum or above threshold difference between corresponding data output by the target and new models 100 and 110. The local device may generate a divergent probe training dataset comprising pairs of inputs associated with the maximum or above threshold differences and corresponding outputs of the target neural network 100. The local device may then train the new neural network 110 to mimic the target neural network 100 with the divergent probe training dataset to maximize the error therebetween and thus the magnitude of correction in each iteration, to accelerate the training process.

After training, the new neural network 110 may ideally have the same exact set of output neurons (13-16) in the output layer as the target neural network 100 (though in practice, one or a small number of output neurons in the target neural network 100 may be missing from the new neural network 110). The input layer and middle layer(s), on the other hand, may be the same or different between the new and target neural networks 100 and 110. In some embodiments, the purpose of generating the new neural network 110 is to create a neural network that has the same or similar predictive behavior as the target neural network 100, but with simpler model structure (e.g., smaller file size, fewer neurons or layers, simpler connection type, etc.). In those cases, the new neural network 110 may be designed to have fewer neurons, synapses, and/or hidden or middle layers, and/or a simpler connection type, than target neural network 100.

By training the untrained new neural network 110 to mimic the pre-trained target neural network 100 without access to its original training data, an embodiment of the invention may allow multiple parties or devices to share and reuse neural networks without sacrificing the security or privacy of the original training data. Such embodiments also allow other parties or devices to improve one party or device's neural network (e.g., sparsifying or evolving the neural network) by mimicking the re-training or second pass training of the target neural network, without accessing the original training data, thereby bolstering security and data privacy. These benefits to data privacy are particularly important in environments that require data secrecy, such as medical applications. In addition, such embodiments support adding new training data or deleting old training data from the neural network without accessing the original training data by adding or deleting the data to/from the divergent probe training dataset. Further, some embodiments allow the model to be modified to add a new or delete an old category or classification of prediction without accessing the original training data. This allows new knowledge to be added and old knowledge to be deleted without overriding the remaining data (preserving synapse connections and weights attributed to the old preserved data). By using a divergent probe training dataset as a placeholder for the original inaccessible training data, embodiments of the invention allow replicating or re-training the neural network after the original training data are deleted, thereby bolstering security by not storing private data and reducing memory storage.

Figure 2:
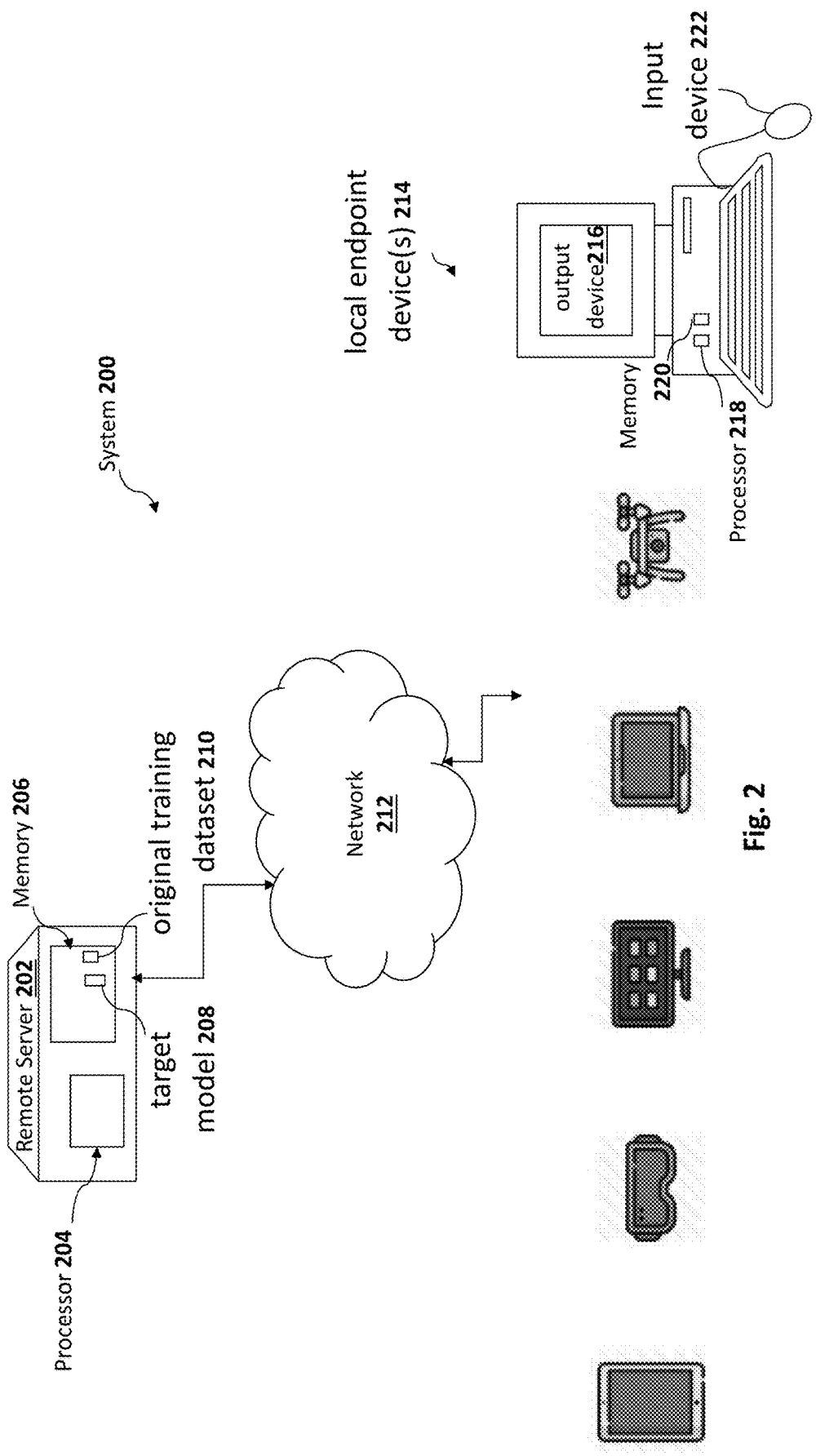
FIG. 2 is a schematic illustration of a system for training a new student neural network to mimic a target neural network in accordance with some embodiments of the invention.

Reference is made to FIG. 2, which schematically illustrates an example system for training a new model to mimic a target model in accordance with some embodiments of the invention. System 200 may store and/or generate the data structures and implement the training and prediction of models described in reference to FIGS. 1 and 3.

System 200 may include one or more local endpoint device(s) 214 and one or more remote server(s) 202 accessible to the local device via a network 212 or computing cloud. Remote server 202 may provide a cloud-based, network-side or server-side model prediction service for local endpoint device(s) 214. Remote server 202 may train, store and/or run a target neural network (e.g., target neural network 100 of FIG. 1). Local endpoint device(s) 214 may send remote server 202 requests to make model predictions for a set of one or more probe inputs. Remote server 202 may run those probe inputs through the target model to generate corresponding outputs, and send those outputs to the local endpoint device(s) 214. While remote server 202 provides the results of the target model, it does not expose or share the target model data themselves or the original training dataset used to train the target model with local endpoint device(s) 214.

Remote server 202 may have a memory 206 for storing target model 208 and optionally its original training dataset 210 and a processor 204 for training and/or predicting based on the target model. In various embodiments, the original training dataset may be stored in remote server memory 210, in an external database or memory, or may be permanently deleted (not stored). Memory 206 may also store data including code (e.g., software code) or logic, e.g., to enable storage and retrieval of target model 208 or original training dataset 210 according to embodiments of the invention. Target model 208 and/or original training dataset 210 may be inaccessible to local endpoint device(s) 214 and/or any external device. In some embodiments, remote server 202 may include, or be operably connected to, specialized hardware including a large memory 206 for storing the target model and/or training dataset and a specialized processor 204 (e.g., a GPU) for training the target model.

Local endpoint device(s) 214 may train, store and/or run a new neural network (e.g., new neural network 110 of FIG. 1). Local endpoint device(s) 214 may each include one or more memories 220 for storing the new neural network and a divergent probe training dataset for training the new neural network to mimic the target neural network. The divergent probe training dataset may include pairs of probe input data and their corresponding target model outputs received from remote server 202. A subset of the probe input data may be selected to be included in the divergent probe training dataset that generates a maximum or above threshold difference between corresponding data output by the target model and the new model. As the new model changes during the training process, so too does the probe input data that cause a maximum or above threshold difference between the models. Accordingly, the divergent probe training dataset is dynamically updated in memory 220 to reflect the most recent divergent behavior. In various embodiments, memory 220 may store the entire divergent probe training dataset used to train the new model at once, or may incrementally store on-the-fly each single or set of multiple training samples used in the current computation, iteration, epoch, current layers, etc., after which the subset is deleted (e.g., by active deletion or replacing the least recently used sample by a new sample).

Local endpoint device(s) 214 may include smart devices, virtual reality devices, drones, personal computers, desktop computers, mobile computers, laptop computers, and/or notebook computers or any other suitable device such as a cellular telephone, personal digital assistant (PDA), video game console, etc., and may include wired or wireless connections or modems. Local endpoint device(s) 214 may include one or more input device(s) 222 for receiving input from a user (e.g., neural network parameters, such as, numbers, sizes, dimensions and configurations of neurons, synapses, and layers, accuracy or training thresholds, etc.). Local endpoint device(s) 214 may include one or more output device(s) 216 (e.g., a monitor or screen) for displaying data to a user generated by device 214 or 202. In various applications, local endpoint device(s) 214 is part of a system for image recognition, computer vision, virtual or augmented reality, speech recognition, text understanding, wireless network beamforming patterns, or other applications of artificial intelligence and deep learning. In the application of facial recognition, a device may mimic a target model to efficiently perform facial recognition to trigger the device to unlock itself or a physical door when a match is detected. In the application of security, a security camera system may mimic a target model to efficiently detect a security breach and sound an alarm or other security measure. In the application of autonomous driving, a vehicle computer may mimic a target model to control driving operations, e.g., to steer away to avoid a detected object.

Network 212, which connects local endpoint device(s) 214 and remote server 202, may be any public or private network such as the Internet. Access to network 212 may be through wire line, terrestrial wireless, satellite or other systems well known in the art.

Local endpoint device(s) 214 and remote server 202 may include one or more controller(s) or processor(s) 204 and 218, respectively, for executing operations according to embodiments of the invention and one or more memory unit(s) 206 and 220, respectively, for storing data and/or instructions (e.g., software for applying methods according to embodiments of the invention) executable by the processor(s). Processor(s) 204 and 218 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 206 and 220 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used. For example, while the above description discloses remote server 202 managing the target neural network and local endpoint device(s) 214 managing the new neural network, either or both of devices 202 and/or 214 may train, store, probe and/or otherwise manage the target and/or new neural networks, for example, depending on system architecture and security requirements.

Reference is made to FIG. 3, which is a flowchart of an example method for training a new neural network (e.g., 110 of FIG. 1) to mimic a target neural network (e.g., 100 of FIG. 1) in accordance with some embodiments of the invention. The operations of FIG. 3 may be executed by a processor (e.g., one or more processor(s) 218 and/or 204 of FIG. 2) using data stored in a memory (e.g., one or more memory unit(s) 220 and/or 206 of FIG. 2). The processor may not have access to the target neural network and/or its original training dataset.

In operation 300, a processor (e.g., 218 at a local device 214 of FIG. 2) may probe the pre-trained target neural network and the untrained new neural network with the same set of input data to generate corresponding data output by the respective target neural network and the new neural network. Probing may include locally probing (e.g., locally inputting the data into the model and outputting the corresponding results) or remotely probing (e.g., transmitting probe input data to a remote device to be remotely probed and receiving the results). In one embodiment, the target neural network (e.g., that is proprietary or secret) may be remotely probed, while the new neural network may be locally probed. To remotely probe the target neural network, the processor may send the set of input data to the remote device (e.g., 202 of FIG. 2), where it is input into the remotely stored target model, and the processor may receive the corresponding output results from the remote device. In general, either or both of the target neural network and the new neural network may be remotely or locally stored and probed. Probing may pass the data through one or multiple (a subset or all) layers of the neural networks, such that the difference is detected for an individual or combination of the output layer and/or one or more hidden layers of the target neural network and the new neural network. In some embodiments, training may be performed layer-by-layer or for a subset of multiple or the set of all layers concurrently, where each of a plurality of sequential stages are used to train a respective sequential layer (or group of multiple layers) of the new neural network.

In operation 302, the processor may detect input data that generate a maximum or above threshold difference between the corresponding data output by the target and new models. The differences may be computed locally (e.g., at 214 of FIG. 2) or remotely (e.g., at 202 of FIG. 2).

In operation 304, the processor may generate a divergent probe training dataset comprising input data that generate the maximum or above threshold difference and the corresponding data output by the target neural network. In some embodiments, the divergent probe training dataset may be generated using an additional (third) neural network trained to output training data, which when input into the new and target neural networks, results in respective outputs that have maximal or above threshold differences therebetween. Additionally or alternatively, the divergent probe training dataset may be generated using an evolutionary model that evolves the dataset to generate outputs that increase or maximize the output differences between the new mimicking and target models. Additionally or alternatively, the divergent probe training dataset may be generated using statistics or heuristics-based methods. Additionally or alternatively, the divergent probe training dataset may be generated by testing random seed input probes and extrapolating the divergent probe training dataset based on resulting behavior of the target and new neural networks. The seed data may be generated randomly or semi-randomly, e.g., by measuring statistical properties of one or more sample inputs of the same type as the original training dataset or an accessible subset thereof, and the set of input data may be semi-randomly selected according to those statistical properties. Additionally or alternatively, multiple random seed probes may comprise a plurality of respective data types or distributions that are different from each other in an input space. The processor may select the data type or distribution for the divergent probe training dataset associated with maximum or above threshold differences between corresponding data output by the target neural network and the new neural network in the output space. The initial test seed probe may be performed as an initial probe prior to, or as part of, the first iteration of operation 302.

In operation 306, the processor may train the new neural network to generate substantially the same corresponding output data as the target neural network using the divergent probe training dataset that is detected to generate a maximum or above threshold difference in the corresponding output data between the new and target models.

In operation 308, if training the new model is complete, the process may terminate. Training may be complete when the processor determines that the new and target models converge (e.g., output difference(s) between the models are sufficiently small or below a convergence threshold) or multiple versions of the divergent probe training dataset updated for sequential training iterations converge (e.g., the difference between their associated maximum difference measures is sufficiently small or below a convergence threshold). In some embodiments, the processor may test a measure of similarity between the new model and the target model by probing both models with samples from the divergent probe training dataset or a new random or semi-random set of inputs to measure the similarity or error between the models' corresponding outputs. A below threshold or asymptotically levelling measure of error may trigger the training process to terminate.

If training the new model is incomplete, the process may return to operation 300 to execute a new training iteration of the new neural network using an updated divergent probe training dataset dynamically adjusted to adapt to the changing structure of the new neural network as it is trained over time. This process may return to operation 300 after every predetermined number of training iterations and/or epochs, and/or upon detecting that the new mimicking and target output differences converge for the previous iteration's divergent probe training dataset, thereby indicating that the new network has properly learned the data in the previous iteration's divergent probe training dataset. Overall, this process may iteratively repeat for a number of total iterations and/or epochs, where in each iteration, a different updated divergent probe training dataset is used to train the new network, until its training completes in operation 308.

After training the new model terminates in operation 308, the new model may be further retrained by repeating the process of FIG. 3 for one or more additional iterations to mimic re-training the target model. Retraining may include sparsifying the new model to mimic the target model, evolving the new model by applying evolutionary algorithms to mimic the target model, setting the structure of the new model to be simpler than the structure of the target model, setting the new model that is a neural network to have a number of neurons, synapses, or layers, to be less than that of the pre-trained target model, setting the new model that is a neural network to have a neuron connection type to be simpler than that of the target model, or any other type of retraining. In some embodiments, the new neural network may be generated, initially trained, and/or re-trained, after all copies of the original training dataset are deleted at the local and/or remote training device.

In some embodiments, the initial training or retraining may include adding new data to the divergent probe training dataset to incorporate new knowledge not present in the target model. In some embodiments, the initial training or retraining may include defining data to be omitted from the divergent probe training dataset to eliminate knowledge present in the target model. In some embodiments, the initial training or retraining may include removing a correlation from the new neural network linking an input to an output, without accessing at least one of the input or output, by adding to the divergent probe training dataset a plurality of random correlations to the output or input, respectively, to weaken or eliminate the correlation between the input and output.

In some embodiments, because the original training dataset is not needed for the initial training or retraining, the processor at the local device may generate the new model or re-train the new model after all (or some) copies of the original training dataset are deleted at the remote device (or from all locations across the system), for example, significantly reducing storage occupied at the remote device. In some embodiments, the local device may only store a subset of samples of the divergent probe training dataset being currently or recently used in operation 306 for training on-the-fly in a temporary memory and delete the samples on-the-fly during operation 306 from the temporary memory after the samples are used to train the new model. This may significantly minimize the storage space used by the divergent probe training dataset.

In operation 310, after training or retraining the new model, the processor may execute the new model in a run-time phase by inputting new data into the new model and generating corresponding data output by the new model. The model may be trained and run for various applications, including, for example, navigating a drone based on the output of the new model.

Other operations or orders of operations may be used.

Such embodiments provide a device, system and method to replicate, add knowledge to, or delete knowledge from, a pre-trained target model without access to the original training dataset, which is currently impossible using conventional mechanisms. Some practical benefits of embodiments of the invention are that, if one device or party hosts a target model (e.g., trained using billions of proprietary training samples), another device or party can now "mimic" the behavior of that model without accessing or exposing the training data. Instead of randomly probing, embodiments of the invention train the divergent neural pathways between the models by generating a divergent probe training dataset isolating input data that cause the most divergent behavior between the models. That disparate behavior yields the greatest error and so is targeted for training to expedite the process, as compared to randomly probing the target model. Further, if a target model is trained to detect (e.g., thousands of) different categories of objects, to add a new category, conventional mechanisms require retraining the entire model from scratch. According to embodiments of the present invention, new knowledge can be incorporated by only defining the added data, while maintaining the stability of pre-existing knowledge using the divergent probe training dataset. Such embodiments can be applied to fine tune pre-existing knowledge as well. For example, last year GOOGLE®'s deep learning model identified a black person as a "gorilla". Despite the outrage, the only solution was to train the entire object recognition module from scratch, while adding more pictures of black people, which could take months. According to embodiments of the invention, the model can be post-trained using pictures of underrepresented classes of people, which can result in an immediate fix to the problem. The training dataset no longer requires the original billions of images, but can use the divergent probe training dataset (to mimic and stabilize the old input) and new data (to post-train the single class that needs to be improved). Post-training according to embodiments of the invention may take less time than conventional re-training because the divergent probe training dataset is dynamically updated for each epoch to adapt to changes in the new network as it is trained, that targets model differences and results in greater data diversity during training, which typically converges faster than reusing the same training samples in every epoch.

The terms "mentor," "target," and "pre-trained" neural network or model may refer to a first neural network that is being mimicked or imitated and the terms "student," "new," and "mimicking" neural network or model may refer to a second neural network that is mimicking or imitating the first neural network.

When used herein, a new model may mimic the behavior of a target model or the new and target models converge when, in response to inputting the same inputs, both models generate the same or approximately/substantially the same outputs for greater than a threshold proportion (e.g., majority or 50%, 75%, 90%, 99%, or any percentage therebetween) of input/output pairs.

Substantially, approximately, or similar may refer herein to a deviation from an exact measure of any threshold less than or equal to 10%.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 206 or 220 of FIG. 2), a disk drive, or a USB flash memory, encoding, including or storing instructions, e.g., computer-executable instructions, which, when executed by a processor or controller (e.g., processor 204 or 218 of FIG. 2), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method, comprising:
  training a new neural network to mimic a target neural network without access to the target neural network or its original training dataset, wherein the target neural network is a single neural network, by:
    probing the target neural network and the new neural network with input data to generate corresponding data output by one or more layers of the respective target neural network and new neural network;
    detecting input data that generate maximum or above threshold differences between corresponding data output by the one target neural network and the new neural network;
    generating a divergent probe training dataset comprising input-output pairs including the input data that generate the maximum or above threshold differences and the corresponding data output by the target neural network;
    training the new neural network to minimize differences between corresponding data output by the new neural network and the target neural network using the divergent probe training dataset detected to generate the maximum or above threshold differences in the corresponding output data between the new and target neural networks; and
    iteratively training the new neural network using an updated divergent probe training dataset updated to replace input-output pairs associated with output differences between the new and target neural networks that have below threshold difference measures with new input-output pairs associated with output differences between the new and target neural networks that have relatively greater difference measures, wherein the trained new neural network has a fewer number of layers and a smaller file size than the target neural network.

2. The method of claim 1, comprising generating the divergent probe training dataset using an additional neural network trained to output training data, that when input into the new and target neural networks, result in respective outputs that have maximal or above threshold differences therebetween.

3. The method of claim 1, comprising generating the divergent probe training dataset using an evolutionary model that evolves to generate outputs that increase or maximize the output differences between the new and target neural networks.

4. The method of claim 1, comprising generating the divergent probe training dataset by testing random seed probes and extrapolating the divergent probe training dataset based on resulting behavior of the target and new neural networks.

5. The method of claim 4, wherein a plurality of the random seed probes comprise a plurality of respective data types or distributions that are different from each other in an input space; and selecting the data type or distribution for the divergent probe training dataset associated with maximum or above threshold differences between corresponding data output by the target neural network and the new neural network in the output space.

6. The method of claim 1, comprising generating the divergent probe training dataset using statistics or heuristics-based methods.

7. The method of claim 1, comprising updating the divergent probe training dataset after every predetermined number of training iterations.

8. The method of claim 1, comprising updating the divergent probe training dataset upon detecting the output differences of the new and target networks converge for a previous version of the divergent probe training dataset.

9. The method of claim 1, wherein the difference between corresponding data output by the target and new neural networks is detected for an individual or combination of output layers or one or more hidden layers of the target and new neural networks.

10. The method of claim 1, comprising adding new data to the divergent probe training dataset to incorporate new knowledge into the new neural network that is not present in the target neural network.

11. The method of claim 1, comprising defining data to be omitted from the divergent probe training dataset to eliminate a category or class from the new neural network that is present in the target neural network.

12. The method of claim 1, comprising removing a correlation from the new neural network linking an input to an output, without accessing at least one of the input or output, by adding to the divergent probe training dataset a plurality of random correlations to the output or input, respectively, to weaken or eliminate the correlation between the input and output.

13. The method of claim 1, comprising, after training the divergent probe training dataset, re-training the new neural network using the divergent probe training dataset to mimic re-training the target neural network.

14. The method of claim 13, comprising sparsifying the new neural network to mimic the target neural network to generate a sparse new neural network.

15. The method of claim 13, comprising evolving the new neural network by applying evolutionary algorithms to mimic the target neural network.

16. The method of claim 1, comprising generating or re-training the new neural network after all copies of the original training dataset are deleted at the training device.

17. The method of claim 1, comprising training the new neural network over multiple epochs with a different divergent probe training dataset in each of the multiple epochs.

18. The method of claim 1, comprising setting the structure of the new neural network to have a number of neurons, synapses, or layers, to be less than that of the target neural network.

19. The method of claim 1, comprising training the new neural network layer-by-layer in a plurality of sequential stages, each stage training a respective sequential layer of the new neural network.

20. The method of claim 1, comprising, after training the new neural network, executing the new neural network in a run-time phase by inputting new data into the new neural network and generating corresponding data output by the new neural network.

21. A system, comprising:
one or more processors configured to train a new neural network to mimic a target neural network, wherein the target neural network is a single neural network, without access to the target neural network or its original training dataset by:
probing the target neural network and the new neural network with input data to generate corresponding data output by one or more layers of the respective target neural network and new neural network:
detecting input data that generate maximum or above threshold differences between corresponding data output by the target neural network and the new neural network;
generating a divergent probe training dataset comprising input-output pairs including the input data that generate the maximum or above threshold differences and the corresponding data output by the target neural network;
training the new neural network to minimize differences between corresponding data output by the new neural network and the target neural network using the divergent probe training dataset detected to generate the maximum or above threshold differences in the corresponding output data between the new and target neural networks; and
iteratively training the new neural network using an updated divergent probe training dataset updated to replace input-output pairs associated with output differences between the new and target neural networks that have below threshold difference measures with new input-output pairs associated with output differences between the new and target neural networks that have relatively greater difference measures, wherein the trained new neural network has a fewer number of layers and a smaller file size than the target neural network.

22. The system of claim 21, comprising one or more memories configured to store the divergent probe training dataset.

23. The system of claim 22, wherein the one or more memories are temporary memories configured to store samples of the divergent probe training dataset on-the-fly and delete the samples on-the-fly after the samples are used to train the new neural network.

24. The system of claim 21, wherein the one or more processors are configured to generate the divergent probe training dataset using an additional neural network trained to output training data, that when input into the new and target neural networks, result in respective outputs that have maximal or above threshold differences therebetween.

25. The system of claim 21, wherein the one or more processors are configured to generate the divergent probe training dataset using an evolutionary model that evolves to generate outputs that increase or maximize the output differences between the new and target neural networks.

26. The system of claim 21, wherein the one or more processors are configured to generate the divergent probe training dataset by testing random seed probes and extrapolate the divergent probe training dataset based on resulting behavior of the target and new neural networks.

27. The system of claim 21, wherein the one or more processors are configured to add new data to, or define data to be omitted from, the divergent probe training dataset to incorporate new knowledge into the new neural network that is not present in, or eliminate pre-existing knowledge from the new neural network that is present in, the target neural network.

28. The system of claim 21, wherein the one or more processors are configured to, after training the new neural network, execute the new neural network in a run-time phase by inputting new data into the new neural network and generating corresponding data output by the new neural network.

29. A non-transitory computer-readable medium comprising instructions which, when implemented in one or more processors in a computing device, cause the one or more processors to:

train a new neural network to mimic a target neural network, wherein the target neural network is a single neural network, without access to the target neural network or its original training dataset by:

probing the target neural network and the new neural network with input data to generate corresponding data output by one or more layers of the respective target neural network and new neural network;

detecting input data that generate maximum or above threshold differences between corresponding data output by the target neural network and the new neural network;

generating a divergent probe training dataset comprising input-output pairs including the input data that generate the maximum or above threshold differences and the corresponding data output by the target neural network;

training the new neural network to minimize differences between corresponding data output by the new neural network and the target neural network using the divergent probe training dataset detected to generate the maximum or above threshold differences in the corresponding output data between the new and target neural networks; and iteratively training the new neural network using an updated divergent probe training dataset updated to replace input-output pairs associated with output differences between the new and target neural networks that have below threshold difference measures with new input-output pairs associated with output differences between the new and target neural networks that have relatively greater difference measures, wherein the trained new neural network has a fewer number of layers and a smaller file size than the target neural network.

30. The non-transitory computer-readable medium of claim 29, comprising instructions which, when implemented in the one or more processors in the computing device, further cause the one or more processors to execute the trained new neural network in a run-time phase by inputting new data into the new neural network and generating corresponding data output by the new neural network.

* * * * *